United States Patent [19] [11] 3,813,602
Van Dijum et al. [45] May 28, 1974

[54] INPUT CIRCUIT FOR A TELEVISION TUNER

[75] Inventors: Adalbertus Hermanus Jacobus Nieveen Van Dijum; Teunis Hermanus Uittenbogaard, both of Mollenhutseweg, Nijmegen, Netherlands

[73] Assignee: U.S. Philips Corporation, New York, N.Y.

[22] Filed: June 2, 1971

[21] Appl. No.: 149,188

[30] Foreign Application Priority Data
June 6, 1970 Netherlands ...................... 7008273

[52] U.S. Cl. ............... 333/81 R, 307/264, 325/319, 325/381, 325/411, 330/185
[51] Int. Cl. ........................... H04b 1/18, H03f 1/00
[58] Field of Search ........... 325/318, 319, 362, 374, 325/376, 387, 408, 411, 414, 373, 375, 377, 381, 383, 397, 400, 413, 484, 485, 488, 490; 307/317, 264; 333/81 R; 330/185

[56] References Cited

UNITED STATES PATENTS 3,012,138 12/1961 Myers et al. ........................ 325/485
3,121,198 2/1964 Potter ............................ 325/414 X
3,153,189 10/1964 Sweeney ......................... 325/414 X
3,243,719 3/1966 Saroni ............................ 324/319 X
3,325,754 6/1967 Frisch ............................ 307/317 X
3,518,585 6/1970 Wilcox ........................... 325/414 X
3,581,210 5/1971 Amfar ................................ 325/411
3,588,894 6/1971 Prickett ......................... 325/411 X
3,613,008 10/1971 Jabbar ............................. 325/319
3,631,333 12/1971 Pichal ................................ 333/81
3,624,561 11/1971 Tongue ........................... 333/81 R

*Primary Examiner*—Robert L. Griffin
*Assistant Examiner*—Marc E. Bookbinder
*Attorney, Agent, or Firm*—Frank R. Trifari; Henry I. Steckler

[57] ABSTRACT

A television tuner having an AGC controlled PIN-diode attenuator between the aerial terminals and the first transistor. The attenuator is formed in such a manner that its output impedance in case of continuing control deviates to an increasing extent from the transistor input impedance so that a considerable improvement of the signal-to-noise ratio is obtained.

7 Claims, 2 Drawing Figures

INPUT CIRCUIT FOR A TELEVISION TUNER

Figure 1:
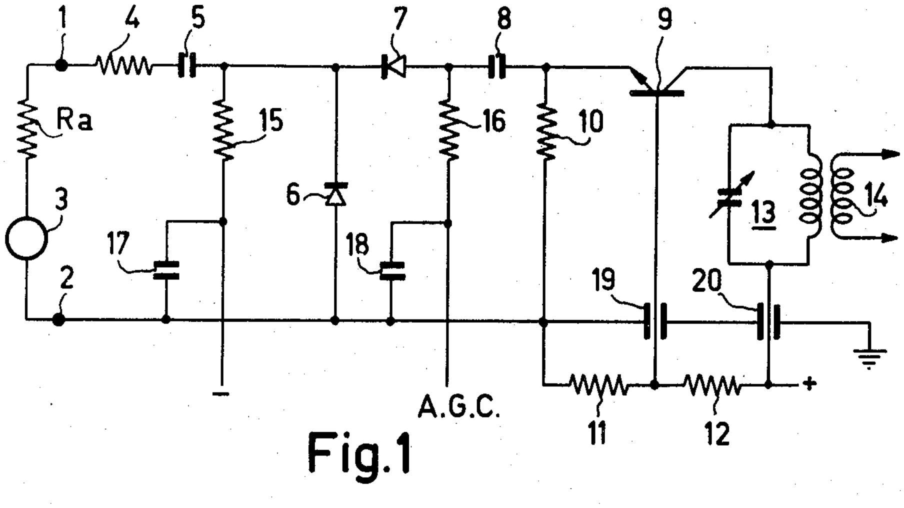

The invention relates to an input circuit for a television tuner including aerial terminals and a transistor in common base configuration.

In an input circuit for a television tuner it should be ensured that:

1. There is sufficient reflection-free matching with the aerial and its supply leads because large reflections in the aerial supply lead give rise to so-called ghosts in the reproduced scene, 2. the input circuit adds as little as possible noise to the desired incoming signal, 3. large input signals are handled sufficiently free from modulation distortion, 4. large interference signals do not cause any noticeable cross-modulation of the desired signal, 5. an automatic gain control is present which in case of large input signals brings about a signal attenuation such that the subsequent stages can handle the signal without noticeable distortion.

Of the above-mentioned requirements the problem of the distortion-free signal handling is found to be predominant in view of the increasing transmitter powers with which the television signals are transmitted. It is therefore important to provide an input circuit for television signals having a considerably improved signal handling capability. It may be noted for the purpose of comparison that the original television tuners equipped with valves and the currently commonly used tuners comprising bipolar transistors can handle signals of approximately 60 mV on a 300 Ohm aerial sufficiently free from distortion, whereas in a tuner including an isolated gate-field effect transistor 160 mV can be admitted to a 300 Ohm aerial. However, it is found to be necessary to provide an input circuit which is suitable for handling signals of 300 mV or more on a 300 Ohm aerial.

It is known per se to use so-called PIN-diodes for the attenuation of RF signals. These are diodes having an intrinsic layer between the p-region and the n-region. For the RF signal currents the PIN-diode mainly behaves as a resistor whose value is dependent on the DC biassing of the diode.

An object of the present invention is to provide an input circuit for a television tuner, which by using such PIN-diodes is simple in structure and has eminent signal handling capabilities and noise properties at a sufficiently large gain control range while maintaining a satisfactory aerial matching and to this end the circuit according to the invention is characterized by a shunt-PIN diode connected across the aerial terminals and a series-PIN diode arranged between the shunt-PIN diode and the emitter electrode of the transistor, as well as means for applying a direct current to the series-PIN diode, which current decreases as the input signal intensity increases and for applying a direct current to the shunt-PIN diode which current increases as the input signal intensity increases, the signal-frequency-impedance connected between the emitter and base electrodes of the transistor increasing to an essential extent as the input signal intensity increases as a result of the increasing impedance of the series-PIN diode.

In the commonly used circuits it is often necessary to incorporate a resonant circuit tuned to the desired signal between the aerial terminals and the controlled transistor or valve so as to attenuate the unwanted signals to such an extent that they do not cause an unacceptable cross modulation in the controlled transistor or valve. In the proposed input circuit the gain control is ensured completely or substantially completely by the PIN-diodes which do not cause substantially any signal distortion and the subsequent transistor can therefore have an adjustment which is optimum for the signal handling capability. For this reason both the coupling between the aerial terminals and the PIN-diode attenuator and the coupling between this attenuator and the transistor input may be nonresonant, which is a considerable simplification of the circuit.

Furthermore, the circuit according to the invention is formed in such a manner that the gain control obtained with the aid of the PIN-diodes is only partially a result of the attenuation of the available signal power increasing with the control. A considerable portion of the control is a result of the fact that the mismatch at the input terminals of the transistor increases with the control; this is in contrast with commonly used nonresonant operating PIN-diode attenuators which are formed in such a manner that they have a substantially constant output impedance. Due to the increasing mismatch a considerable improvement of the signal-to-noise ratio in case of a continuing control is obtained.

It is to be noted that it is known per se from the German Auslegeschrift 1,163,910 to use a diode attenuator consisting of a shunt diode and a series diode followed by a transistor in common base configuration. Since this circuit does not include PIN-diodes, however, only relatively small signal amplitudes can be handled. In addition the known circuit does not relate to an input circuit but to an intermediate stage whose noise properties, as is known, do not play substantially any role.

In order to obtain an optimum signal-to-noise ratio also for weak input signals the input circuit according to the invention is preferably proportioned in such a manner that the output impedance for the signal frequencies of the PIN-diode attenuator in the uncontrolled condition is slightly lower than the optimum noise impedance of the transistor and passes this optimum noise impedance in case of continuing control.

Figure 2:
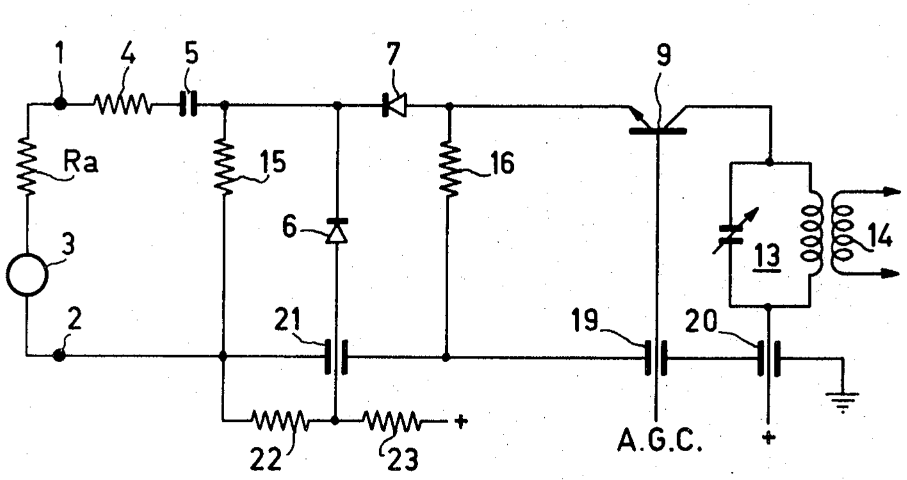

In order that the invention may be readily carried into effect, some embodiments thereof will now be described in detail, by way of example with reference to the accompanying diagrammatic drawing, in which:

FIG. 1 shows a first embodiment of an input circuit according to the invention and FIG. 2 shows a second embodiment of an input circuit according to the invention.

The circuit of FIG. 1 comprises aerial terminals 1 and 2, the latter 2 of which is connected to earth. An aerial having a supply lead may be connected optionally with the interposition of an impedance transformer to said terminals. The aerial and its supply lead is symbolically indicated by a voltage source 3 having an internal resistor $R_a$.

The signals from the aerial terminal 1 are applied through a resistor 4 and a coupling capacitor 5 to the interconnected cathodes of a shunt-PIN diode 6 and a series-PIN diode 7. The anode of the PIN-diode 6 is connected to earth and the anode of the PIN-diode 7 is connected through a coupling capacitor 8 to the emitter electrode of a transistor 9. An emitter resistor 10 and a base potential divider consisting of two resistors 11 and 12 serve for the DC biasing of the transistor 9. A resonant circuit 13 which can be tuned to the desired signal is coupled to the collector electrode of the transistor 9 and a coupling loop 14 coupled to the inductance of this circuit serves for deriving the signal thus selected. It is to be noted that, for example, bandpass filters may be incorporated between the aerial terminals and the PIN-diodes 6–7 and/or between the PIN-diodes and the transistor, which bandpass filters pass the signals for the relevant television band, but on the other hand have a predominantly aperiodical character for the desired channel.

The cathodes of the PIN-diodes 6 and 7 are connected through a resistor 15 to a negative voltage source and the anode of the series-PIN diode 7 is connected through a resistor 16 to a positive automatic gain control (AGC) voltage which may be derived in a manner not further shown from the amplified signal.

Bypass capacitors 17 and 18 and lead-through capacitors 19 and 20 connect the lower side of the resistor 15, the lower side of the resistor 16, the base electrode of the transistor and the lower side of the resonant circuit 13 for the signal frequencies to earth.

When a relatively weak desired signal is received, the AGC voltage is so high that a direct current of, for example, 3 mA flows through the resistor 16, the series-PIN diode 7 and the resistor 15. The resistance of the PIN-diode 7 is then low, for example, 10 Ohms, while the resistance of the PIN-diode 6 through which substantially no direct current flows is relatively high, for example, 1,000 Ohms. As the amplitude of the desired signal increases, the AGC voltage is decreased, so that the direct current through the resistor 16 and the series-PIN diode 7 decreases which results in an increase of the resistance of this PIN-diode. Since the direct voltage on the upper side of the resistor 15 remains substantially at earth potential as a result of the diode 6 and also the lower side of this resistor is at a constant negative voltage, the direct current flowing through resistor 15 is substantially constant (3 mA). The decrease of the current flowing through the PIN-diode 7 is therefore accompanied by an equally large increase of the current flowing through the PIN-diode 6 so that its resistance decreases. Both PIN-diodes are therefore controlled while the AGC voltage only needs to be applied to one point in the circuit.

The increasing resistance of the PIN-diode 7 and the decreasing resistance of the PIN-diode 6 cause the desired signal attenuation. Since the PIN-diodes constitute substantially linear resistances for the RF signals, no noticeable signal distortion is introduced. By biasing the direct current of the transistor 9 in such a manner that the signal distortion caused by this transistor is also at a minimum, a circuit is obtained which has eminent properties as regards the signal handling capability. It is to be noted that as the circuit can handle larger signals, the start of the automatic gain control can be delayed to a later instant which is favourable for the signal-to-noise ratio.

As a result of the opposed resistances of the two PIN-diodes, the input impedance of the circuit is within certain limits independent of the automatic gain control. This is further improved by the insertion of the resistor 4 of, for example, 22 Ohms. In this manner it is ensured that the standing-wave ratio at the aerial terminals is not larger than, for example, 2.5 so that a sufficient extent of reflection freedom is ensured at the aerial terminals for the entire control range.

An important aspect of the circuit according to the invention is that a considerable portion of the signal attenuation caused by the PIN-diodes is realized by the fact that the mismatch at the transistor terminals increases with a continuing control. The total attenuation (in dB) is the sum of the decrease of the available signal power caused by the attenuator and the mismatching occurring at the transistor input terminals. The decrease of the signal-to-noise ratio caused by the attenuator is, however, equal to the decrease of the available signal power. As a result the signal-to-noise ratio at the transistor input terminals increases in case of control approximately as much as the signal attenuation as a result of the increase of the said mismatching.

Let it be assumed that the available signal power at the aerial terminals increases by A+B dB, the PIN-diode attenuator causes a decrease of the available signal power by A dB and the increasing mismatching at the transistor input terminals causes an increasing signal loss of B dB. The signal level at the output of the transistor is then constant which is the object of the automatic gain control. The increase of the available signal power at the aerial terminals by A+B dB also involves an increase of the signal-to-noise ratio at the aerial terminals by A+B dB. The PIN-diodes cause a decrease of the available signal power by A dB and hence a decrease of the signal-to-noise ratio by A dB. Thus, an increase of the signal-to-noise ratio by B dB results at the transistor input terminals.

If, for example, in the circuit of FIG. 1 the aerial resistor $R_a = 75$ Ohms, the resistor 4 = 22 Ohms, the PIN-diode 6 in the uncontrolled condition is 1,000 Ohms and is 10 Ohms in the controlled condition, the PIN-diode 7 in the uncontrolled condition is 10 Ohms and is 1,000 Ohms in the controlled condition, and if the transistor input resistance is 10 Ohm (the resistors 15, 16 and 10 do not exert influence on the signal attenuation) it may be calculated that the loss of available signal power by the elements 4, 6 and 7 in the uncontrolled condition is 1.9 dB and in the controlled condition is 31.9 dB. The control thus causes a decrease (A) of 30 dB of the available signal power. The output impedance of the attenuator then varies, however, from 98 Ohms to 1,009 Ohms, this leads to a mismatching loss which varies from 4.7 to 14.1 dB. The control thus causes an increase (B) of 9.4 dB of the mismatching loss. In the circuit thus proportioned an improvement of the signal-to-noise ratio of 9.4 dB is obtained at the transistor input terminals in case of a control range of 39.4 dB.

The own noise of the transistor 9 is left out of consideration hereinbefore. The signal-to-noise ratio at the output of the transistor is equal to the signal-to-noise ratio at the transistor input terminals reduced by the noise factor F (in dB) of the transistor. This noise factor is dependent on the impedance connected to the transistor input terminals and has a minimum value at a certain value of this impedance, the so-called optimum noise impedance, which is approximately 120 Ohms for the common transistors for television input circuits. To obtain an optimum signal-to-noise ratio for the entire circuit, the PIN-diode attenuator is proportioned in such a manner that the output impedance of this attenuator to which the transistor is connected is lower in the uncontrolled condition than the said optimum noise impedance of the transistor and passes this optimum noise impedance in case of continuing control. As can be seen this requirement is met in the above-mentioned example of proportioning.

The circuit of FIG. 1 has the drawbacks that an AGC source is required which is capable of providing comparatively much current and that both a negative and a positive voltage source are required. These drawbacks are obviated in the circuit of FIG. 2. In this Figure the circuit elements which correspond to the circuit elements of FIG. 1 have the same reference numerals.

In this circuit the resistors 15 and 16 are directly connected to earth; the anode of the PIN-diode 6 is connected through a lead-through capacitor 21 to a positive voltage which is provided by a potential divider comprising resistors 22 and 23: the emitter electrode of transistor 9 is DC-coupled to the anode of the PIN-diode 7, and the AGC voltage is applied to the base electrode of the transistor 9. The transistor 9 now also functions as a DC amplifier for the automatic gain control. In the uncontrolled condition the AGC voltage at the base electrode of the transistor is such that a current of, for example, 7 mA flows through this transistor. Of this current, for example, 4 mA flows through the resistor 16 and 3 mA flows through the series-PIN diode 7 and the resistor 15, while the diode 6 is substantially blocked. When the AGC voltage at the base of the transistor is reduced, the emitter current is reduced to approximately 3 mA and the current flowing through the diode 7 is reduced to substantially O mA while the current flowing through the diode 6 decreases to approximately 2 mA. The AGC control is thus established by a relatively small current variation in the transistor, As a result it is ensured that the signal handling capability of the transistor is not detrimentally influenced. The transistor then of course does not contribute noticeably to the gain control.

By choosing a transistor of the pnp-type in the circuit of FIG. 2 for the transistor 9, by connecting the lower side of the resistor 16 to the positive supply voltage and by connecting the lower side of the resonant circuit 13 to earth, a circuit is obtained in which the PIN-diode attenuator is controlled to a larger attenuation by causing the direct current of the transistor to increase.

Since in the described circuits corresponding electrodes of the two PIN-diodes are directly connected together, these PIN-diodes may advantageously be manufactured jointly on one substrate.

What is claimed is:

1. An attenuator for a common base transistor amplifier circuit having a given input impedance, said attenuator comprising an input means for receiving an input signal, a shunt controllable impedance element coupled in parallel with said input means, an output means for applying a signal to said circuit, a series controllable impedance element coupled between said input and output means, and means for controlling the attenuation of said attenuator both for changing the transfer impedance function thereof and by causing the output impedance thereof to rise and become increasingly mismatched with respect to said circuit input impedance as the amplitude of the input signal increases, said controlling means comprising means coupled to said elements for applying a direct current that is a function of said input signal thereto, whereby the impedance of said elements changes, and wherein said attenuator has an optimum output impedance at which the noise figure of said circuit is a minimum, said output impedance being slightly lower than said optimum impedance at small input signal levels and is greater at large input signal levels.

2. An attenuator as claimed in claim 1 wherein said attenuation elements each comprise a PIN diode.

3. An attenuator as claimed in claim 1 wherein the direct current in said series element decreases and the direct current in said shunt element increases as said input signal increases.

4. An attenuator for a common base transistor amplifier circuit having a given input impedance, said attenuator comprising an input means for receiving an input signal, a shunt controllable impedance element coupled in parallel with said input means, an output means for applying a signal to said circuit, a series controllable impedance element coupled between said input and output means, and means for controlling the attenuation of said attenuator both for changing the transfer impedance function thereof and by causing the output impedance thereof to rise and become increasingly mismatched with respect to said circuit input impedance as the amplitude of the input signal increases, said controlling means comprising means coupled to said base for applying a direct current that is a function of said input signal thereto, whereby the impedance of said elements changes.

5. An attenuator as claimed in claim 4 wherein said attenuator has an optimum output impedance at which the noise figure of said circuit is a minimum, said output impedance is slightly lower than said optimum impedance at small input signal levels and is greater at large input signal levels.

6. An attenuator as claimed in claim 4 wherein said attenuation elements each comprise a PIN diode.

7. An attenuator as claimed in claim 4 wherein the direct current in said series element decreases and the direct current in said shunt element increases as said input signal increases.

* * * * *